B. F. HINKLEY.
Planter and Fertilizer.
No. 108,262.
Patented Oct. 11, 1870.
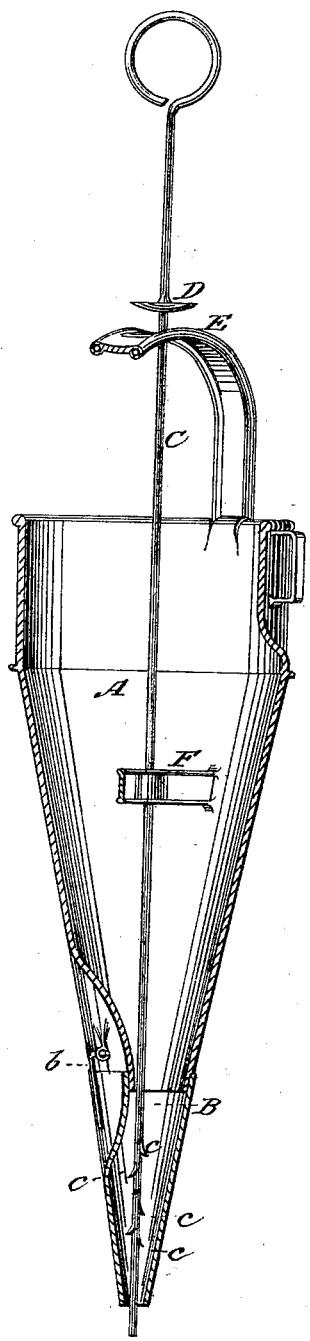

United States Patent Office.

BENJAMIN F. HINKLEY, OF BALTIMORE, MARYLAND.

Letters Patent No. 108,262, dated October 11, 1870.

IMPROVEMENT IN GUANO-DISTRIBUTERS AND SEED-SOWERS.

The Schedule referred to in these Letters Patent and making part of the same

---

I, BENJAMIN F. HINKLEY, of the city of Baltimore, in the State of Maryland, have invented an Improved Guano and Seed-Sower, of which the following is a specification.

Nature and Objects of the Invention.

The invention consists of a portable receptacle for the seed, preferably swung by a strap from the shoulder of the operator, and a piston of peculiar character, operated by hand, to project the fertilizer or seed from the nozzle, at the lower end of the receptacle.

The device is intended for local application of guano, plaster, superphosphate, or other fertilizer, in the hill, or for dropping such seeds as are preferably planted in hills rather than in drills or broadcast.

It is, however, apparent that good work may be accomplished in drilling, as the rapidity of the periodical reciprocation of the piston (regard being had to the rate of walking of the operator) will determine the distance apart of the deposits of seed in the row.

Provision is made for the positive expulsion, in limited quantities, of the guano or the seed, as the case may be, in case of the use of glutinous or damp fertilizers, or of seeds which become aggregated, such as cotton-seed.

Description of the Accompanying Drawing.

The drawing represents a vertical central section of the apparatus.

General Description.

A is a receptacle for seed, having a capacity suitable for the occasion, say, one peck for fertilizers, or something less for seeds.

The lower portion of the receptacle has a funnel-shape, in order to determine downward the bulk of the contents which are to be discharged at the nozzle.

The spout B, which forms the lower part of the receptacle, is made shiftable, so that a spout with a larger or smaller aperture may be used according to the character of the material which is to be expelled.

Some fertilizers are loose, and run freely; others are somewhat lumpy, or are apt to become sticky. It is evident that the size of the aperture should be adapted to the specific purpose.

Further, cotton-seed is somewhat larger, and is also fibrous, so that the seeds adhere together. Their expulsion requires a larger aperture than some other seeds which might be mentioned.

The spout B slips upon the lower end of the main portion, and is secured by a hook, $b$, or by any equivalent fastening.

The piston C occupies an axial position in the apparatus, and is reciprocated by hand, its lower end protruding from the seed-can A.

Two things are to be observed in the construction of the piston C:

First, it has barbs or jags $c$, which point obliquely downward, so as to catch against the material (fertilizer or seed) in the downward stroke, and assist in the rejection. This provision is to insure that the rod shall not merely slip back and forth in the contents of the spout.

Second, the piston-rod C has a button, D, which comes in contact with the handle E of the seed-can at the end of the stroke of the piston. This causes a sudden arrest of motion of the latter, and causes the expulsion of the seed or fertilizer with a sort of jerk, which assists in detaching it from the piston C, should the material be slightly damp or glutinous, as may happen with some descriptions of fertilizer, or should the seed be fibrous, as happens with cotton-seed from which the lint has not been perfectly removed.

F is a transverse brace, which forms a guide for the piston C, as does also the handle E.

Claims.

I claim as my invention—

1. The combination of a receptacle, A, of any suitable form, and a reciprocating piston, C, provided with barbs or jags $c$, by which the fertilizer or seed is driven out at the aperture, as specified and set forth in the specification.

2. The piston C, with its barbs or jags $c$, and a button, D, or its equivalent, which suddenly arrests the motion of the piston, so as to give an expulsive action which tends to clear the piston, substantially as described.

3. A shiftable nozzle, B, admitting of the adaptation of spouts with apertures of varying sizes, in combination with the receptacle A and the piston C, substantially as and for the purpose described.

To the above specification of my improved guano and seed-sower, I have signed my hand this 5th day of May, 1870.

B. F. HINKLEY.

Witnesses:
CHAS. P. McCALLA,
EDWARD H. KNIGHT.